United States Patent Office 3,081,314
Patented Mar. 12, 1963

3,081,314
PROCESS FOR PREPARING 3,4-DIMETHOXY-TOLUQUINONE
Ram Niwas Goel, Basel, Rudolf Rüegg, Bottmingen, and Ulrich Schwieter, Basel, Switzerland, assignors to Hoffmann-La Roche Inc., Nutley, N.J., a corporation of New Jersey
No Drawing. Filed May 24, 1960, Ser. No. 31,275
Claims priority, application Switzerland June 15, 1959
2 Claims. (Cl. 260—396)

This invention relates to novel chemical processes, and to novel chemical compounds useful as intermediates therein. More particularly, the invention relates to novel chemical processes and intermediates for the preparation of 3,4-dimethoxytoluquinone.

In a comprehensive view, the invention teaches a process of making 3,4-dimethoxytoluquinone which comprises coupling 3,4,5-trimethoxytoluene with a diazonium salt, reducing the azo compound obtained to 2-methyl-4,5,6-trimethoxyaniline, and oxidizing the latter.

The novel processes and the novel intermediates of the invention are herein further disclosed with reference to the following diagrammatic representation of a preferred embodiment thereof.

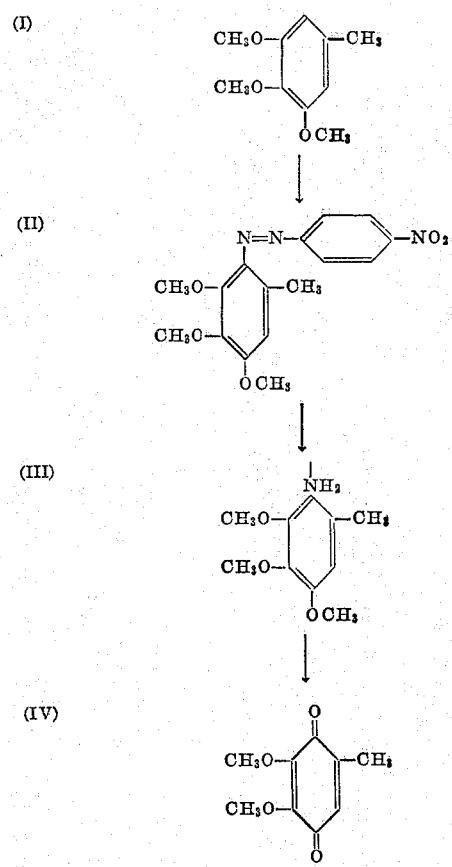

In the preferred embodiment illustrated by the diagram, 3,4,5-trimethoxytoluene (I) is coupled with a diazonium salt of p-nitroaniline; e.g. by reacting (I), in solution in an inert solvent (e.g. a lower alkanol such as methanol or ethanol) and at a low temperature, with a solution of p-nitrobenzenediazonium chloride. The reaction product, 2-methyl-4,5,6-trimethoxy-4'-nitroazobenzene (II), in solution in an inert solvent (e.g. a lower alkanol such as methanol or ethanol, or a lower alkyl lower alkanoate, such as ethyl acetate) is then catalytically hydrogenated at normal temperature and pressure in the presence of a palladium hydrogenation catalyst.

This procedure results in the formation of 2-methyl-4,5,6-trimethoxyaniline (III), the desired product, along with p-phenylenediamine as a byproduct. Separation of these two is readily accomplished by the use of ether; the former product being soluble in ether, the latter insoluble.

In a final reaction step, the substituted aniline (III) is oxidized, at temperatures between about minus 20° C. and about plus 40° C. In a preferred mode of execution, the substituted aniline (III) (in the form of an acid addition salt thereof, for example with mineral acids such as hydrochloric or hydrobromic acid) is dissolved in water, and the aqueous solution is covered with a layer of a water-immiscible organic solvent, in which the reaction product is soluble, in contradistinction to the acid addition salt which is insoluble. As solvents, there can be employed, for example, benzene, toluene, petroleum ether, methylene chloride, chloroform and ether. Preferably, ether is employed. The oxidizing agent—for example, ferric chloride, ferric sulfate or potassium dichromate (preferably the latter)—is then added to the two-phase mixture while stirring. As the reaction proceeds, the 3,4-dimethoxytoluquinone (IV) formed is continuously taken up by the supernatant organic layer.

The end product, 3,4-dimethoxytoluquinone, is a known substance, and novelty is not claimed as to this substance per se. The compound 3,4-dimethoxytoluquinone is an intermediate (in already published syntheses) for ubiquinones and ubihydroquinones. The former are of interest as essential components in the mitochondrial electron transfer chain. The latter are useful as antioxidants (e.g. for foodstuffs, feedstuffs and pharmaceutical composition) and as intermediates for the ubiquinones.

The invention is further disclosed in the following example, which is illustrative but not limitative thereof.

*Example*

400 g. of the methyl ester of trimethylgallic acid is dissolved in 1500 ml. of methanol and the solution is shaken for 15 minutes with 100 g. of Raney nickel in order to remove impurities. The Raney nickel is separated and 200 g. of cupric chromite is added. Then the mixture is hydrogenated at 250° to 270° C. under a hydrogen pressure of 150 atmospheres. To the methanolic solution obtained is added 10 g. of palladized carbon and a few drops of perchloric acid, and the hydrogenation is continued until further uptake of hydrogen ceases. The solvent is removed under diminished pressure and the residue is purified by distillation. The product 3,4,5-trimethoxytoluene is obtained as a pale yellow oil, B.P. 68°/0.03 mm.

28 g. of p-nitroaniline is suspended in 300 ml. of water and 60 ml. of concentrated hydrochloric acid is added. The mixture is then heated until a clear solution forms, and the latter is filtered. The filtrate is cooled in an ice bath to 0° C. and then a solution of 15 g. of sodium nitrite in 100 ml. of water is added slowly, with continuous shaking and while cooling to keep the temperature from rising above 0° C. The diazonium chloride solution thus obtained is purified by filtration.

A solution of 36 g. of 3,4,5-trimethoxytoluene in 200 ml. of alcohol is placed in a one-liter three-neck flask, which is provided with a stirrer, and the solution is cooled to 0° C. The diazonium solution obtained as described in the preceding paragraph is then added slowly over a period of 10 to 15 minutes while stirring and cooling to maintain the temperature between 0° C. and 5° C. The reaction mixture is stirred for an additional period of 5 to 6 hours at this temperature and then the mixture is slowly brought to room temperature. The precipitate which forms is filtered off and recrystallized from dilute alcohol, yielding 2-methyl-4,5,6-trimethoxy-4'-nitroazobenzene, M.P. 90° C.

2 g. of 2-methyl-4,5,6-trimethoxy-4'-nitroazobenzene is dissolved in 50 ml. of methanol and 1 g. of palladized carbon is added. The mixture is hydrogenated at normal temperature and pressure until the hydrogen uptake ceases; a total of approximately 5 mols of hydrogen is taken up. The reaction mixture is filtered, and the clear yellow filtrate is immediately evaporated to dryness under diminished pressure. The residue is treated with absolute ether, whereupon 2-methyl-4,5,6-trimethoxyaniline goes into solution, whereas p-phenylenediamine for the most part remains undissolved. Upon evaporation of the ether solution, 2-methyl-4,5,6-trimethoxyaniline is obtained as a brown oil, which is very unstable to oxygen of the air and other oxidizing agents.

1.2 g. of the above brown oily 2-methyl-4,5,6-trimethoxyaniline is dissolved in 30 ml. of 3 N sulfuric acid and the solution obtained is added to a three-neck flask provided with a stirrer. Then the solution is covered with a layer of 100 ml. of ether. While stirring, a solution of 1 g. of potassium dichromate in 25 ml. of water is added over a period of 10 minutes, at room temperature. Then the mixture is stirred for an additional period of 50 minutes. At the end of this time, the reaction mixture is extracted with ether and the ether solution is dried over sodium sulfate. Upon removal of the solvent by distillation, there is obtained 3,4-dimethoxytoluquinone, which after recrystallization has M.P. 57 to 59° C.; ultraviolet absorption maximum $E_1^1=800$ at 260 m$\mu$ (in petroleum ether).

We claim:

1. A process of making 3,4-dimethoxytoluquinone which comprises coupling 3,4,5-trimethoxytoluene with a diazonium salt of p-nitroaniline, reducing the azo compound obtained to 2-methyl-4,5,6-trimethoxyaniline, and oxidizing the latter.

2. A process of making 3,4-dimethoxytoluquinone which comprises oxidizing 2-methyl-4,5,6-trimethoxyaniline.

References Cited in the file of this patent
UNITED STATES PATENTS

| | | |
|---|---|---|
| 1,318,631 | Weiss et al. | Oct. 14, 1919 |
| 1,892,310 | Kraenzlein et al. | Dec. 27, 1932 |
| 2,231,707 | Dickey et al. | Feb. 11, 1941 |
| 2,285,243 | Weinmayr | June 2, 1942 |
| 2,381,877 | Carpenter | Aug. 14, 1945 |
| 2,423,542 | Wright | July 8, 1947 |